United States Patent [19]

Tucker et al.

[11] 3,920,196
[45] Nov. 18, 1975

[54] FILM CARTRIDGE

[75] Inventors: Archie J. Tucker; Stephen H. Miller; Robert C. Sutliff, all of Rochester, N.Y.

[73] Assignee: Eastman Kodak Company, Rochester, N.Y.

[22] Filed: Apr. 30, 1974

[21] Appl. No.: 465,452

[52] U.S. Cl. .............................. 242/194; 242/199
[51] Int. Cl.² ..................... G03B 1/04; G11B 15/32
[58] Field of Search ......... 242/71.2, 84.8, 194, 199; 352/72, 78 R, 78 C

[56] References Cited
UNITED STATES PATENTS

| | | | |
|---|---|---|---|
| 2,951,654 | 9/1960 | Steelman | 242/55.19 A |
| 3,208,686 | 9/1965 | Edwards et al. | 242/194 |

Primary Examiner—Leonard D. Christian
Attorney, Agent, or Firm—G. H. Childress

[57] ABSTRACT

A film cartridge loaded with a roll of motion picture film having a magnetic stripe on one surface of the film is subject to shaking or impacts during handling of the cartridge which results in displacement of some convolutions of the film in a direction parallel to the axis of the film roll, especially when the film has first clocksprung in a radial direction. When this occurs, friction between the displaced convolution and the adjacent convolutions of the film effectively prevents return of the stepped convolution to its original position. Subsequently, when film is to be pulled from the supply roll during operation of a camera in which the cartridge is positioned, the stepped convolutions can contact a wall of the cartridge defining the supply chamber in the cartridge and produce a frictional force that opposes normal unwinding of the film. This can result in improperly exposed film. In order to avoid the undesirable results from stepped film, the film supply chamber is expanded in a direction parallel to the axis of the roll. This expansion of the supply chamber is effected by a pusher member which is urged against a wall of the supply chamber to cause that wall to flex in an outward direction, thereby obtaining some additional space within the supply chamber to permit substantially free rotation of the film roll even if it has become stepped. Movement of the pusher member to a position for flexing the cartridge wall is effected by a rodlike member comprising part of a disengageable anti-backup mechanism. The rod can be moved to a position for moving the pusher member in response to proper insertion of the cartridge into an operative position in the camera.

3 Claims, 7 Drawing Figures

FILM CARTRIDGE

CROSS-REFERENCE TO RELATED APPLICATIONS

Reference is made to commonly assigned copending U.S. patent applications Ser. No. 336,142, entitled FILM CARTRIDGE, filed in the names of Stephen H. Miller, Robert C. Sutliff, Archie J. Tucker, Neil S. White and Bruce L. Elle, on Feb. 26, 1973, now U.S. Pat. No. 3,858,968, and Ser. No. 323,019 entitled Disengageable Anti-Backup Device for Film Cartridge, filed Jan. 12, 1973 in the name of Archie J. Tucker.

BACKGROUND OF THE INVENTION

1. Field of the Invention

This invention relates to film cartridges of the type used in motion picture cameras and the like and, more particularly, to such a film cartridge adapted to receive a roll of motion picture film having a sound stripe on one surface of the film which projects from such surface.

2. Description of the Prior Art

Commonly assigned U.S. Pat. No. 3,208,686 entitled Film Cartridge, issued Sept. 28, 1965 in the name of E. A. Edwards et al., discloses a super 8 film cartridge for motion picture cameras or the like wherein a coreless roll of motion picture film is positioned around (but not attached to) a stationary post in a supply chamber of the cartridge and is withdrawn from the chamber along a film path past an exposure aperture and is then wound onto a takeup core in a takeup chamber of the cartridge, the supply and takeup chambers being in substantially parallel planes and being coaxially disposed with respect to each other. As is well known in the art, the film supply roll in such a cartridge is coreless and therefore is subject to clockspringing, i.e., successive convolutions of the film roll may be displaced radially outwardly relative to the central axis of the roll due to the tendency of a coiled, unsecured film supply roll to unwind. It also is known to modify such cartridges to provide for recording of sound onto the film in the cartridge simultaneous with exposure of the various film frames to scene light. In this regard, reference is made to U.S. Pat. No. 3,442,580 issued May 6, 1969 in the name of A. Winkler. When such cartridges are loaded with film containing a magnetic stripe for recording of sound, the magnetic stripe typically is placed along one side edge of one surface of the film and adjacent the central area of the film where photographic emulsion on the other surface is exposed to scene light. A balance stripe is typically provided on the other side edge of the one surface of the film beside perforations in the film. Both the recording stripe and the balance stripe project from the surface of the film. Because the walls defining these supply chambers in the cartridge are spaced apart by a distance somewhat greater than the width of the film roll to minimize frictional contact therebetween, the various film convolutions can sidestep in a random manner by a distance which allows a sidestepped convolution to overlap one of the stripes (e.g., the sound stripe) and contact one wall of the supply chamber. This problem is especially pronounced when the film has clocksprung as a result of handling during packaging, shipping, etc. As noted before, this results in excessive frictional contact by the supply roll of film and at least one wall of the film supply chamber, and may result in unsatisfactory exposure of film in a camera. Attempts to force the stepped convolutions to return to their original position by surface formations on the walls of the cartridge chamber generally are not satisfactory due to the frictional contact between the stepped convolutions of the film and the adjacent convolutions.

Commonly assigned copending patent application Ser. No. 336,142 entitled "Film Cartridge", filed Feb. 26, 1973 now U.S. Pat. No. 3,858,968, in the names of R. C. Sutliff et al., discloses a cartridge construction which avoids the undesirable results from stepped film. Such application describes a film cartridge having a slidable member with one end portion thereof positioned in a locating notch where it is engageable by a locating pin on one wall of a cartridge chamber of a camera when the cartridge is inserted into the camera. When thus engaged, another end portion of the slidable member moves over a cam surface on a stationary supply post and is forced against a wall of the supply chamber, thereby to expand the film supply chamber in a direction parallel to the axis of the roll. Such application also discloses use of the slidable member for securing the innermost convolution of film against rotation until the cartridge is positioned in a camera so that clockspringing, and thus stepping of the film is avoided.

Commonly assigned copending U.S. patent application Ser. No. 323,019 entitled Disengageable Anti-Backup Device for Film Cartridge, filed Jan. 12, 1973 in the name of Archie J. Tucker discloses an anti-backup device for a film cartridge having a take-up core rotatable in a take-up chamber of the cartridge for winding of film onto the core. The core and an axially movable control member or rod have interlocking portions which, when engaged, are effective to prevent rotation of the take-up core in the take-up direction only. When the cartridge is loaded into a camera the movable control member can be shifted in an axial direction to disengage the interlocking portions on the control member and the take-up core, thereby to permit rotation of the core in both a winding and unwinding direction. Disengagement of the interlocking portions permits filming of fade and lap dissolve type sequences and also eliminates the clicking noise that may be associated with the rotation of the take-up core in the absence of disengagement of the interlocking portions.

SUMMARY OF THE INVENTION

It is an object of the present invention to provide a film cartridge which overcomes the difficulties encountered as a result of stepping of film in a supply roll of film in a cartridge.

Another object of the invention is to provide a film cartridge for motion picture film or the like having a sound stripe thereon wherein the film can be properly advanced through the cartridge and correctly exposed even though the supply roll of film in the cartridge has become clocksprung and/or stepped.

A still further object of the invention is to provide a film cartridge for motion picture film or the like having a sound stripe thereon with the film in the supply roll being subject to stepping, wherein the frictional forces between stepped convolutions of film and walls of the supply chamber in the cartridge can be reduced in response to loading of the cartridge into the camera and closing of a cover or door on a cartridge chamber in the camera thereby improving the operation of the cartridge in the camera.

In accordance with the present invention, a film cartridge is provided having walls defining a supply chamber for a roll of film or the like having a tendency to become stepped in an axial direction, and a take-up chamber having a rotatable take-up core located in the take-up chamber. One of the walls of the supply chamber is flexible, and a pusher member is positioned in the cartridge so that when it is pivoted from a first position to a second position it is effective to move the flexible wall outwardly for expanding the size of the supply chamber, thereby enlarging the size of the chamber and permitting the film roll to rotate even though the convolutions have become stepped. The pusher member is moved to its second position wherein it is effective to flex the cartridge wall in response to movement of a control member or rod of an anti-backup mechanism of the cartridge to the position wherein it is effective to permit free rotation of the core in both directions.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because photographic apparatus is well known, the present description will be directed in particular to elements forming part of, or cooperating more directly with, the present invention, apparatus not specifically shown or described herein being understood to be selectable from those known in the art.

Figure 2:
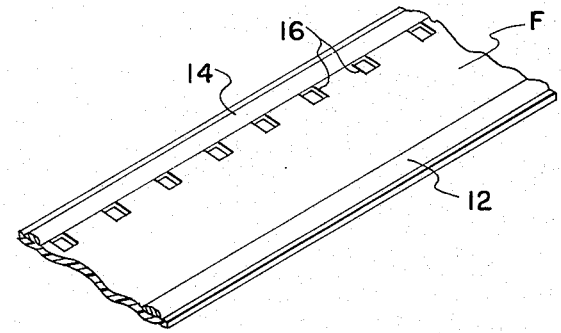
FIG. 2 is an enlarged perspective view of a portion of a film strip of the type that can be loaded in the cartridge shown in FIG. 1.

Referring now to the drawings in detail, a film cartridge according to the present invention is generally designated 10 and is adapted to be loaded with film F. As best shown in the FIGS. 2 and 3, the film F may be a film strip having a stripe 12 of magnetic recording material along one side edge of one surface of the film and a balance stripe 14 along the other side edge of the same surface of the film. The balance stripe is located adjacent to a plurality of perforations 16 in the film strip, and the light sensitive emulsion on the film typically is located on the opposite (lower) surface of the film.

Figure 3:
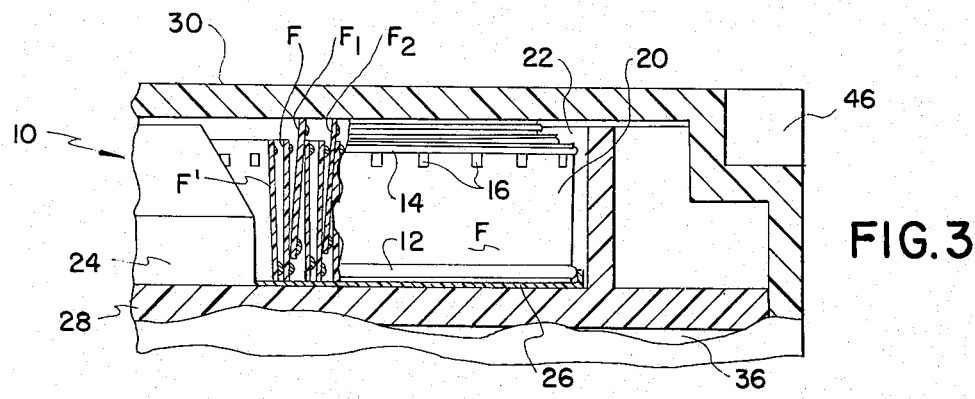
FIG. 3 is an enlarged fragmentary view of a portion of the supply side of a film cartridge showing certain convolutions of film stepped in a manner which is considered undesirable.

As noted earlier, sound film of the type shown in FIG. 2, when loaded in a super 8 film cartridge as disclosed in the beforementioned Edwards et al. patent, tends to clockspring, and this allows the convolutions of the film to step randomly. In part, the clockspringing of the supply roll of film in the cartridge, and thus the resulting stepping of the various convolutions, occurs because the film in the supply chamber of the Edwards et al. cartridge is a coreless roll of film, i.e., it is not attached to a reel, core or the like and therefore the inner convolution of film is not held stationary. FIG. 3 illustrates the stepping condition that can result from loading of film of the type shown in FIG. 2 in a cartridge as disclosed in the Edwards et al. patent. Thus FIG. 3 illustrates a coreless roll 20 of film F located in a supply chamber 22 of the film cartridge. The inner end F' of the film is unattached and loosely positioned around a stationary supply post 24. The film convolutions designated F1 and F2 have become stepped and the lower portions thereof frictionally contact the sound stripe 12 of the film convolutions radially inwardly of the convolutions F1 and F2. The film roll 20 rests on an anti-friction disc 26 which may be of the type disclosed in the commonly assigned U.S. Pat. No. 3,208,685 issued Sept. 28, 1965 in the names of E. A. Edwards and A. J. Tucker and entitled Anti-Friction Disk for Strip Material Cartridge. Because of the anti-friction disc, the film roll can rotate relatively freely with respect to the bottom or inner wall 28 of the supply chamber in the cartridge. However, the stepped convolutions of film F1 and F2 contact the inner surface of the upper wall or cover 30 of the supply chamber and produce a friction force when the supply roll is rotated (as is necessary during advancement of film in a camera). This force increases the load required for proper advancement of film and, as noted earlier, can result in improper exposure of film.

To the extent the cartridge 10 incorporates the same or similar structures as described in connection with FIG. 3, the same reference numerals have been used to designate the same parts of the cartridge 10. Referring now to FIGS. 1 and 4–7, the sound cartridge 10 illustrated in the drawings includes a sound aperture 32 which opens to the bottom and backside of the cartridge (as viewed in FIG. 1) and is adapted to receive certain elements of sound apparatus in a camera. Film in supply chamber 22 is unwound in a counterclockwise direction and threaded past an exposure aperture 34 in the cartridge for exposure to scene light in a camera. The film is then advanced through the sound aperture 32 in the cartridge for recording of sound onto the film. Then the film is fed into a takeup chamber 36 located below wall 28 in a plane parallel to the plane of the supply chamber. As is well known in the art, film in the takeup chamber can be wound onto a core 60 that is substantially coaxial with the supply roll and post 24 in the supply chamber.

Figure 1:
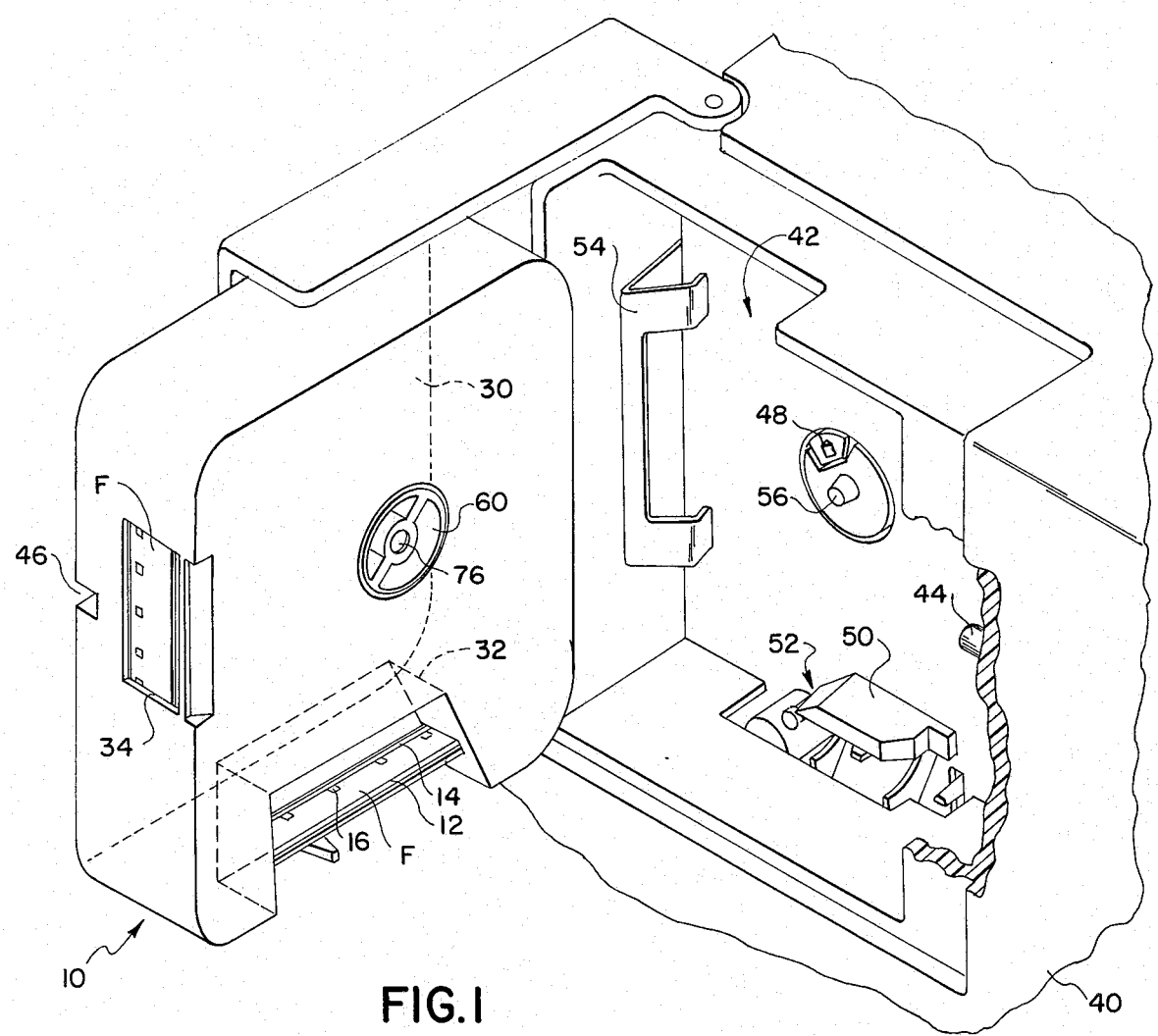
FIG. 1 is a perspective view, partially broken away, illustrating a cartridge constructed in accordance with the present invention and a portion of a motion picture camera or the like adapted to receive the cartridge.

The cartridge 10 is adapted to be positioned in a motion picture camera or the like, a portion of which is generally designated 40 in FIG. 1. Camera 40 comprises a cartridge chamber or compartment 42 having a locating pin 44 on one wall of the chamber which is adapted to be received by a locating notch 46 in the cartridge for locating the cartridge with respect to chamber 42. A drive member 48 projects through the back wall of the cartridge chamber and is engageable with the takeup core 60 of the cartridge in a conventional manner. The member 48 is rotated by a friction drive for rotating the core in a takeup direction during operation of the camera. A shroud 50 and certain elements of sound apparatus generally designated 52 are at least partially received in the sound aperture 32 of the cartridge. Apparatus 52 can record sound on the magnetic stripe 12 of the film simultaneous with exposure of film through exposure aperture 34. The cartridge is urged toward the right (toward locating pin 44) by suitable spring means 54 in the cartridge chamber. A pin 56 can be provided for disengaging an anti-backup mechanism of the type disclosed in the beforementioned copending patent application Ser. No. 323,019 filed in the name of Archie J. Tucker.

Figure 7:
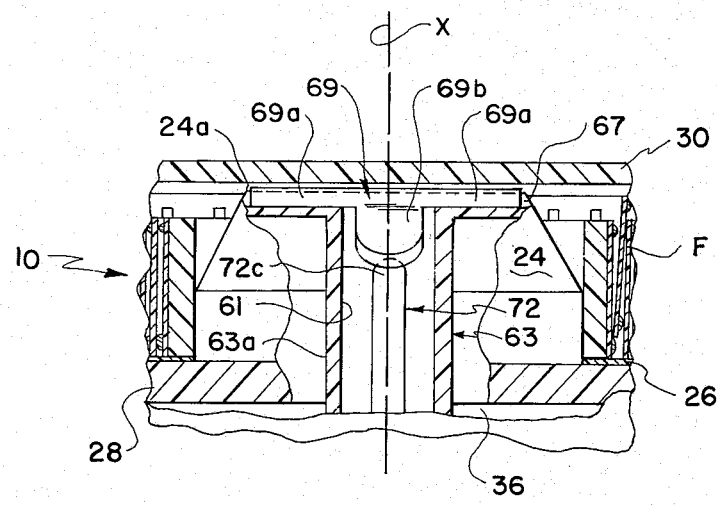
FIG. 7 is a fragmentary cross-section view taken along line 7—7 of FIG. 5.
Figure 5:
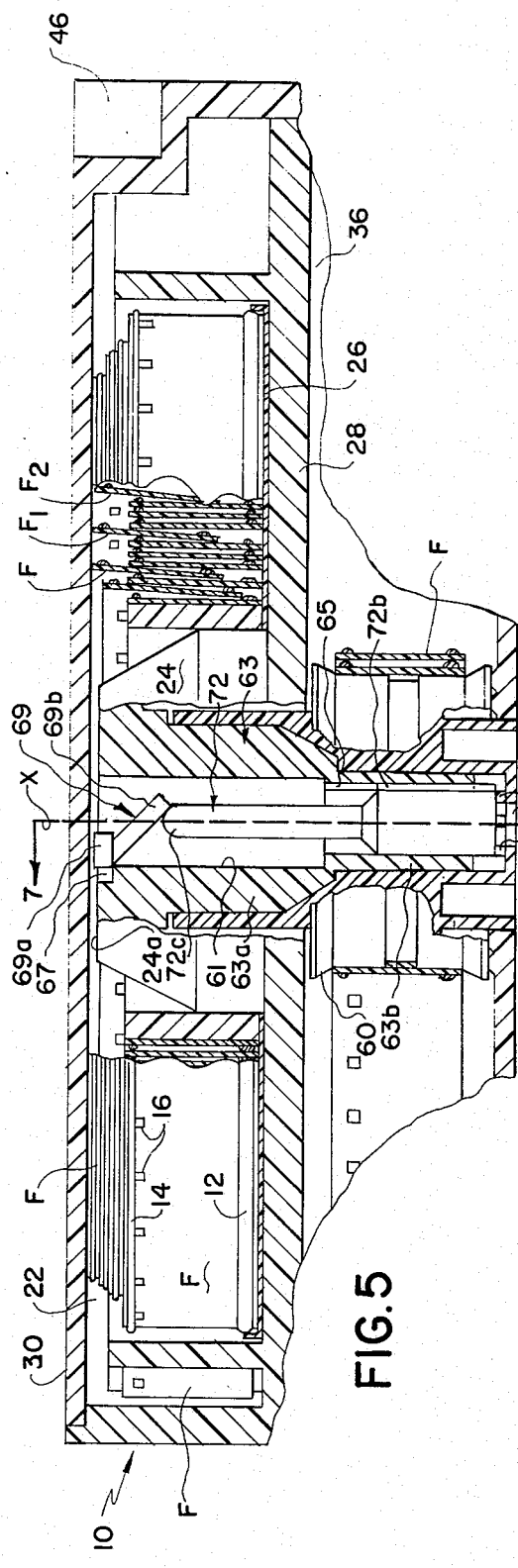
FIG. 5 is an enlarged fragmentary transverse cross-section through a film cartridge of the invention showing the pusher member and anti-backup mechanism in an initial position and showing a stepped film roll.
Figure 6:
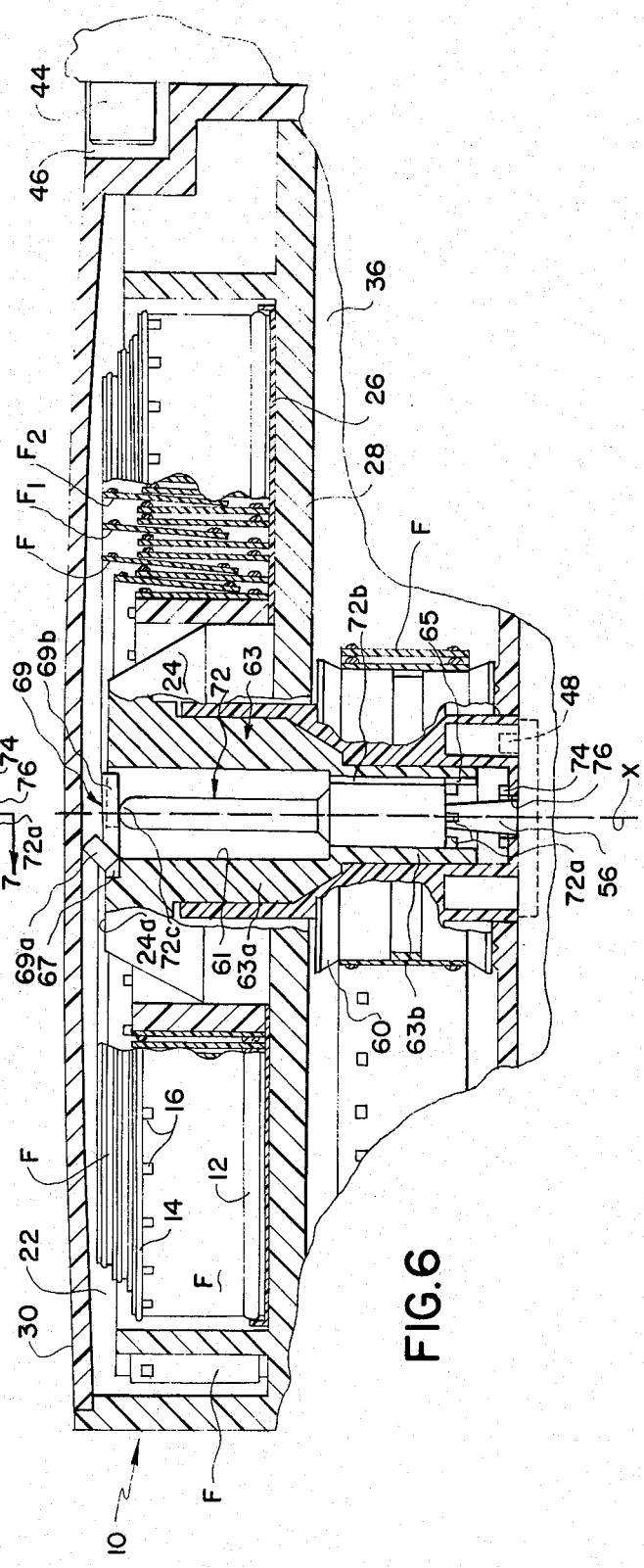
FIG. 6 is a view similar to FIG. 5 but illustrating the pusher member and anti-backup mechanism in a moved position wherein the supply chamber of the cartridge is enlarged or expanded and wherein the anti-backup mechanism is disengaged to permit free rotation of the take-up core in either of two directions.

In accordance with the present invention means are provided for expanding the size of the supply chamber 22 in the cartridge by spreading the cover 30 in an upward direction (as viewed in FIGS. 5–7). These means avoid the problems referred to hereinbefore which result from clockspringing and then stepping of the film roll. More specifically, the supply post 24 has an opening 61 defined by a stepped, generally cylindrical wall 63 which comprises an upper portion 63a and a lower portion 63b, the lower portion being somewhat smaller in inside diameter than the upper portion. The lower portion 63b has a keyway 65 on the inner surface thereof. The axis of opening 61 is substantially coaxial with the axis X of the roll of film in the supply chamber and the take-up chamber of the cartridge. Recess 61 opens to the upper surface 24a of the supply post and faces the inner surface of the cartridge wall 30. Opening 61 also is open at its lower end, and faces the inner surface of take-up core 60.

Figure 4:
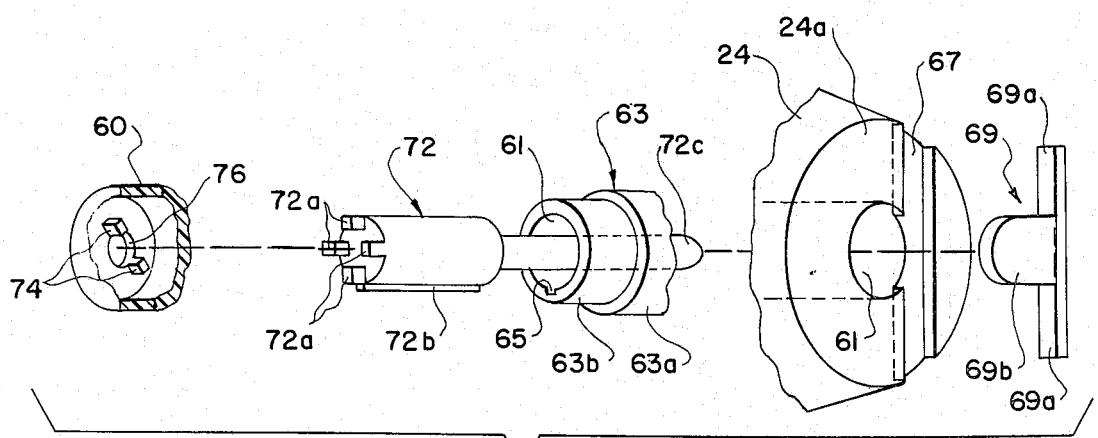
FIG. 4 is a fragmentary exploded view illustrating portions of the anti-backup mechanism and pusher member of the invention.

As best shown in FIG. 4, a groove 67 can be provided in the upper surface 24a of the supply post in communication with the opening 61. Groove 67 is elongated in a direction perpendicular to axis X and extends to the side edges of the supply post.

A pusher member, generally designated 69, comprises elongate arm portions 69a and 69b. Portion 69a is elongate in a direction which is substantially perpendicular to the length of portion 69b. Arm portion 69a is located in a plane disposed at an acute angle with respect to the plane occupied by arm portion 69b (as best shown in FIGS. 5 and 6). Pusher member 69 is assembled in the cartridge so that arm portion 69a is received in the groove 67 and the arm portion 69b projects into the recess 61 in the supply post as best shown in FIG. 5. As will be observed from FIGS. 5 and 6, axis X extends through the arm portion 69b. Because arm portion 69a is generally flat, the pusher member normally will remain in the position illustrated in FIG. 5. This also is facilitated by the upper surface of the arm portion 69a being located closely adjacent the inner surface of cartridge wall 30. As will be apparent from the drawings, the arm portion 69b comprises a lever arm portion which, when moved upwardly, exerts a pivoting force onto the base portions 69a which is effective to cause the pusher member to pivot in the groove 67 about its lower left edge. As shown in FIG. 6, this urges the base portion 69a against wall 30 of the cartridge to flex the wall outwardly, thereby expanding the size of the supply chamber 22 of the cartridge.

In the preferred embodiment illustrated in the drawings, pusher member 69 is moved from its FIG. 5 to its FIG. 6 position by an actuator comprising a rod or control member 72 which comprises part of an anti-backup mechanism for the cartridge. As disclosed in more detail in the beforementioned copending, commonly assigned patent application Ser. No. 323,019 for Disengageable Anti-Backup Device for Film Cartridge, it is known to provide an anti-backup device for the take-up core 60 of a cartridge so that the core is normally rotatable only in a take-up direction, and it is also known from that application to disengage the anti-backup mechanism to permit rotation of the core both in a winding direction and an unwinding direction. As disclosed in that application, this result is achieved by interlocking surface formations on the rotatable core and a non-rotatable control member that is moved axially to disengage the interlocking formations when rotation of the core in both directions is desired.

Referring now to FIGS. 4–7, the control member 72 illustrated is positioned in recess 61 coaxial with axis X and is movable along the axis between the two positions shown in FIGS. 5 and 6. The lower end of the control rod (the end located in the take-up side of the cartridge) has a plurality of projecting teeth 72a which are adapted to interlock with complimentary projecting teeth 74 formed on the inner surface of the take-up core 60 when the rod is in the position illustrated in FIG. 5. Due to the shape of the teeth shown, the core will be held against rotation in either direction when the teeth are engaged. Movement of the rod to its FIG. 6 position disengages the interlocking surface formations.

The portion of control rod 72 slidable in lower wall portion 63b is generally cylindrical and has a key 72b on the side edge thereof which is positioned in the keyway 65 in wall portion 63b of the supply post. This holds the rod against rotation relative to the supply post but permits the rod to be moved axially relative to the supply post. The upper end 72c of the control rod is positioned just below the arm portion 69b of the pusher member when the teeth on the lower end of the rod are engaged with the teeth on the take-up core. The rod is moved upwardly from its FIG. 5 to its FIG. 6 position by pin 56 in the camera which is adapted to project through an opening 76 in the take-up core which is coaxial with axis X.

When the cartridge is loaded into the camera the pin 56 on the camera is received in the opening 76 in the take-up core 60. As this occurs the pin 56 engages the lower end of the rod 72, thereby forcing the rod to move from its FIG. 5 to its FIG. 6 position. This frees the core 60 for rotation in either a take-up direction or an unwinding direction and eliminates any clicking noise which might be associated with operation of an anti-backup mechanism (as may occur with a conventional film cartridge). As rod 72 moves to its FIG. 6 position, the upper end 72c thereof pushes upwardly on arm portion 69b of the pusher member, thereby causing the arm 69 to pivot from its FIG. 5 to its FIG. 6 position. When this occurs, the upper right edge of the arm portion 69a engages the inner surface of wall 30 of the cartridge, thereby flexing that wall from its FIG. 5 to its FIG. 6 position to enlarge or expand the size of the supply chamber in the cartridge. This effects a separation between any of the stepped convolutions of film and the inner surface of wall 30 and permits normal use of the cartridge. Thus the effects of stepping are overcome, and normal filming operations can be achieved. When the cartridge is removed from the camera the rod 72 is free to move downwardly (due to the withdrawal of pin 56). Such movement of rod 72 can take place in response to force exerted by wall 30 tending to return to its normal (FIG. 5) position. The interlocking teeth 72a and 74 comprising the anti-backup mechanism of the cartridge will be engaged either in response to initial return movement of the rod or after a slight rotational movement of the take-up core.

The invention has been described in detail with particular reference to preferred embodiments thereof, but it will be understood that variations and modifications can be effected within the spirit and scope of the invention.

We claim:

1. In a film cartridge having walls defining (1) a supply chamber for a roll of film or the like having a tendency to become stepped in an axial direction and (2) a take-up chamber for receiving film, one of the walls defining the supply chamber being flexible, the cartridge having a supply post located in the supply chamber with a surface of the post being adjacent the flexible wall, and a take-up core rotatable in the take-up chamber for winding up film into that chamber, the improvement comprising:

a pusher member positioned in the cartridge between the surface of the supply post and said flexible wall, said member being mounted for pivotal movement between a first position and a second position and being effective when moved from its first position to its second position to flex said one wall outwardly and thereby expand the chamber, and a control member mounted in the cartridge for movement between a first position and a second position relative to said pusher member and being effective to pivot said pusher member into its second position when moved from its first position to its second position, and said control member having means engageable with said take-up core when said control member is in its first position for securing said core against rotation, said securing means being disengaged from said take-up core when said control member is in its second position to permit rotation of said take-up core.

2. In a cartridge as set forth in claim 1 wherein said take-up core has a tooth on a surface facing said control member, and said securing means comprises at least one tooth engageable with said tooth on the take-up core for securing the take-up core against rotation, and means keying said control member to the cartridge so that said control member is held against rotation with respect to the cartridge walls.

3. In a film cartridge as set forth in claim 2 wherein said supply post has a groove on said surface of said supply post, and said pusher member having two elongate arm portions, one of said arm portions being positioned in the groove on said post, and the other of said arm portions being positioned in the cartridge so that it can be engaged by said control member, said arm portions being disposed at an acute angle with respect to each other.

* * * * *